United States Patent
Sabelhaus et al.

(10) Patent No.: US 9,650,955 B2
(45) Date of Patent: May 16, 2017

(54) SYSTEM FOR PURGING GAS FUEL CIRCUIT FOR A GAS TURBINE ENGINE

(75) Inventors: Eric Michael Sabelhaus, Cincinnati, OH (US); Thomas Edward Stowell, Houston, TX (US); James Charles Przytulski, Fairfield, OH (US); Raymundo Aviles Sandoval, Queretaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1354 days.

(21) Appl. No.: 13/294,088

(22) Filed: Nov. 10, 2011

(65) Prior Publication Data
US 2013/0118178 A1    May 16, 2013

(51) Int. Cl.
F02C 3/22    (2006.01)
F02C 7/232    (2006.01)

(52) U.S. Cl.
CPC .............. *F02C 3/22* (2013.01); *F02C 7/232* (2013.01)

(58) Field of Classification Search
CPC ...... F02C 7/232; F02C 3/22; F23K 2301/203; F23D 2209/30
USPC ........... 60/39.094, 39.463, 39.53, 742; 431/3
See application file for complete search history.

(56) References Cited

U.S. PATENT DOCUMENTS

| | | | |
|---|---|---|---|
| 4,893,467 A * | 1/1990 | Woodson | 60/39.3 |
| 4,969,324 A * | 11/1990 | Woodson | 60/775 |
| 5,369,951 A * | 12/1994 | Corbett et al. | 60/39.3 |
| 5,540,045 A * | 7/1996 | Corbett et al. | 60/39.3 |
| 5,720,164 A * | 2/1998 | Corbett et al. | 60/39.53 |
| 6,145,294 A | 11/2000 | Traver et al. | |
| 6,250,065 B1 | 6/2001 | Mandai et al. | |
| 6,367,239 B1 * | 4/2002 | Brown et al. | 60/775 |
| 6,393,827 B1 | 5/2002 | Nakamoto | |
| 6,438,963 B1 | 8/2002 | Traver et al. | |
| 8,340,886 B2 * | 12/2012 | Nenmeni et al. | 701/103 |
| 2008/0154474 A1 | 6/2008 | Iasillo et al. | |
| 2009/0025396 A1 * | 1/2009 | Joshi et al. | 60/773 |
| 2011/0036092 A1 * | 2/2011 | Lawson et al. | 60/772 |
| 2011/0265488 A1 * | 11/2011 | Lawson et al. | 60/775 |
| 2012/0167547 A1 * | 7/2012 | Zhang et al. | 60/39.183 |
| 2013/0098056 A1 * | 4/2013 | Zhang et al. | 60/775 |
| 2014/0013754 A1 * | 1/2014 | Slobodyanskiy et al. | 60/722 |

FOREIGN PATENT DOCUMENTS

JP    H11210494 A    8/1999

OTHER PUBLICATIONS

Chinese Office Action, Aug. 18, 2015; Application No. 201210445683.2; 15 pages, which includes the translation.

* cited by examiner

*Primary Examiner* — William H Rodriguez
*Assistant Examiner* — Carlos A Rivera
(74) *Attorney, Agent, or Firm* — Fletcher Yoder, P.C.

(57) ABSTRACT

A system includes a multi-fuel gas turbine configured to operate on both a liquid fuel system and a gas fuel system, wherein the multi-fuel gas turbine comprises a compressor, a combustor, and a turbine. The system also includes a gas fuel purge system configured to purge a gas fuel circuit of the gas fuel system during liquid fuel operation of the gas turbine, wherein the gas fuel purge system is configured to sequentially purge the gas fuel circuit with air and steam.

16 Claims, 8 Drawing Sheets

SYSTEM FOR PURGING GAS FUEL CIRCUIT FOR A GAS TURBINE ENGINE

BACKGROUND OF THE INVENTION

The subject matter disclosed herein relates to gas turbine engines with a multi-fuel system.

In general, gas turbine engines combust a mixture of compressed air and fuel to produce hot combustion gases. Certain gas turbine engines include multi-fuel systems that use, for example, both gas and liquid fuels, where the multi-fuel system allows the transfer from one fuel to the other. During the transfer from one fuel (e.g., first fuel) to another fuel (e.g., second fuel), use of the first fuel is terminated. However, during first fuel operation, coking, backflow of combustion products into the first fuel piping system, and faster deterioration of engine hardware may occur.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a multi-fuel gas turbine configured to operate on both a liquid fuel system and a gas fuel system, wherein the multi-fuel gas turbine comprises a compressor, a combustor, and a turbine. The system also includes a gas fuel purge system configured to purge a gas fuel circuit of the gas fuel system during liquid fuel operation of the gas turbine, wherein the gas fuel purge system is configured to sequentially purge the gas fuel circuit with air and steam.

In accordance with a second embodiment, a system includes a dual air and steam purge system configured to purge a gas fuel circuit coupled to a multi-fuel gas turbine during liquid fuel operation of the multi-fuel gas turbine. The dual air and steam purge system comprises an air purge circuit configured to purge the gas fuel circuit with air and a steam purge circuit configured to purge the gas fuel circuit with steam.

In accordance with a third embodiment, a method for purging a gas fuel circuit of a multi-fuel gas turbine that includes beginning operation of the multi-fuel gas turbine on a liquid fuel. The method also includes initially purging the gas fuel circuit with air. The method further includes monitoring steam parameters of a steam supply to determine if the steam parameters meet a steam injection permissive threshold. The method yet further includes subsequently purging the gas fuel circuit with steam upon the steam parameters meeting the steam injection permissive threshold.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
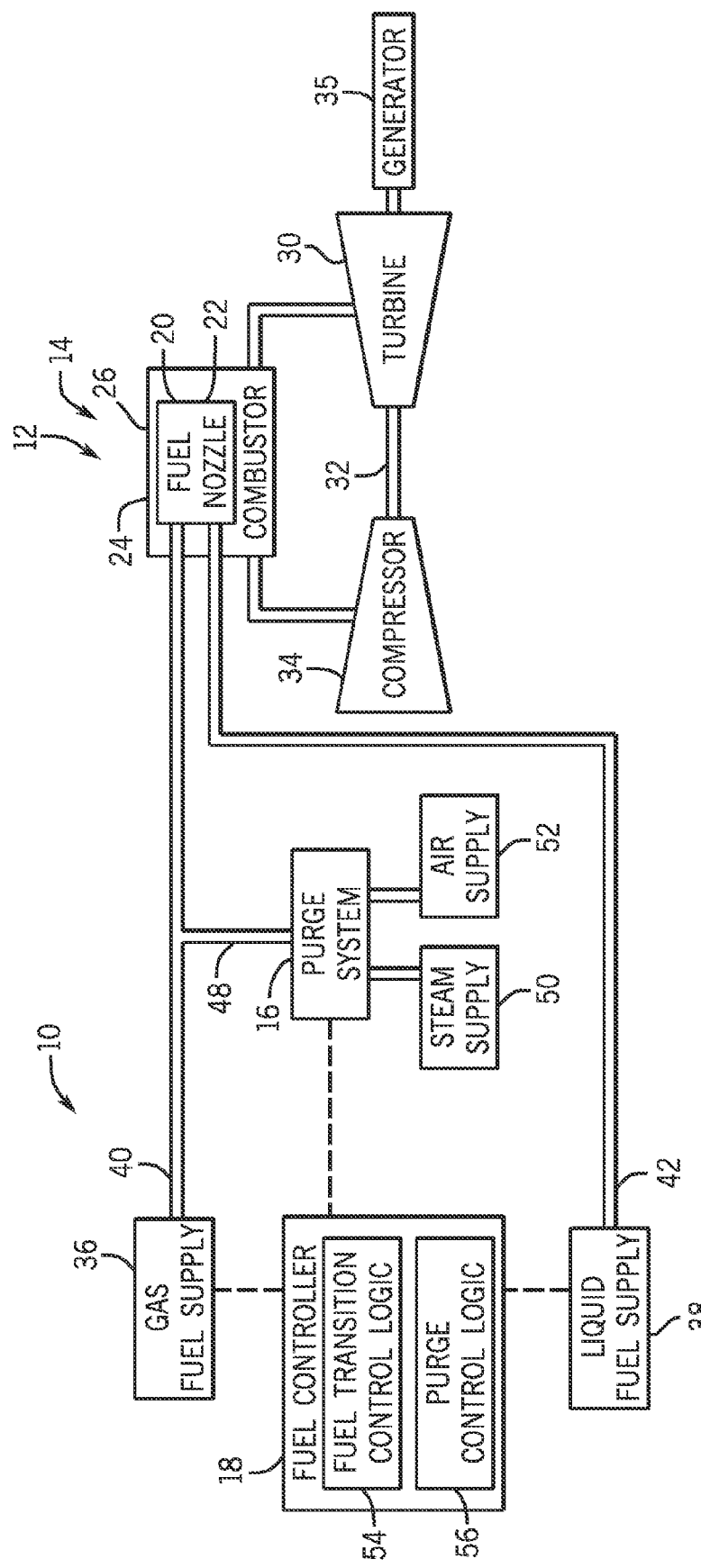
FIG. 1 is a schematic block diagram of an embodiment of a fuel management system for a turbine system having a dual air and steam purge system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for purging a gas fuel circuit of a gas turbine engine with a multi-fuel system (e.g., liquid and gas fuel) and steam injection system during liquid fuel operation. In gas turbine engines with multi-fuel systems, the gas fuel circuit (e.g., gas fuel lines, fuel nozzles, and gas manifold) may be purged during liquid fuel operation of the gas turbine engine to avoid coking, backflow of combustion products into the gas fuel lines and fuel nozzles, and faster deterioration of engine hardware. In addition, the multi-fuel gas turbine engine may be provided steam to augment the power output of the multi-fuel gas turbine engine. Embodiments of the present disclosure provide a system that includes a gas fuel purge system (e.g., dual air and steam purge system) configured to purge the gas fuel circuit of the gas fuel system during liquid fuel operation of the gas turbine. In particular, the gas fuel purge system is configured to sequentially purge the gas fuel circuit with air and steam. For example, the gas fuel purge system is configured to initially purge the gas fuel circuit of the gas fuel system with air prior to meeting a steam injection permissive threshold (e.g., boiler warms up until steam reaches a particular temperature and pressure) and to subsequently purge the gas fuel circuit with steam upon meeting the steam injection permissive threshold (while also providing steam to the gas turbine engine to augment the power output of the multi-fuel gas turbine engine). The gas fuel system may include both an air purge circuit for purging the gas fuel circuit with the air and a steam purge circuit for purging the gas fuel circuit with the steam. In certain embodiments, the air purge circuit and the steam purge may be parallel or partially independent circuits that converge into a common purge circuit. For example, the gas fuel purge circuit may include a three-way valve that includes a first port that interfaces with a line from a steam supply, a second port that interfaces with a line from a compressor discharge port of a compressor of the gas turbine engine, and a third port that interfaces with the air purge circuit. The three-way valve is configured to open a combination of the ports to either enable air or steam to be used for purging the gas fuel circuit. In other embodiments, the air purge circuit and the steam purge circuit are completely independent circuits. The gas turbine system may also include a controller (e.g., turbine fuel controller) configured to control the gas fuel purge system and the sequential purging of the gas fuel circuit with air and steam (e.g., via a purge control logic). These systems are designed to enable dual air and steam purging of the gas fuel from the gas fuel system, while enabling the use of steam to augment the power output of the multi-fuel gas turbine engine.

FIG. 1 is a schematic block diagram of an embodiment of a fuel management system 10 for a turbine system 12 (e.g., gas turbine engine 14) having a dual air and steam purge system 16 (e.g., gas fuel purge system). As described in detail below, the disclosed dual air and steam purge system 16 is configured to sequentially purge a gas fuel circuit of the gas fuel system (e.g., gas fuel lines, fuel nozzles, and gas manifold) during liquid fuel operation of the gas turbine engine 14, while also providing steam to the gas turbine engine 14 to augment the power output of the engine 14. Although the following disclosure discusses purging the gas fuel circuit of the gas fuel system during liquid fuel operation of the gas turbine engine 14, in certain embodiments, the purge system 16 may be utilized to purge liquid fuel from the liquid fuel system during gas fuel operation by the gas turbine engine 14. In addition, in other embodiments, the purge system 16 may be utilized to purge a fuel circuit (e.g., gas or liquid fuel circuit) of the fuel system during fuel operation with a different fuel of the same type (e.g., gas fuel or liquid fuel). The fuel management system 16 employs a fuel controller 18 (e.g., turbine fuel controller) configured to control the supply of fuel to the gas turbine engine 14, in particular, the termination of one fuel supply and the transition to another fuel supply. In addition, as described in greater detail below, the fuel controller 18 is configured to control the dual air and steam purge system 16 and, in particular, the sequential purging of the gas fuel circuit with air and steam to maintain a continuous flow of fluid (e.g., air or steam) in the gas fuel circuit to prevent recirculation of combustible fluids from a combustor back into the gas fuel circuit. The turbine system 12 may use multiple fuels, such as liquid and/or gas fuels, to feed the gas turbine engine 14 (e.g., multi-fuel gas turbine). In certain embodiments, the turbine system 12 may alternatively use a liquid fuel and a gas fuel. In other embodiments, the turbine system 12 may alternatively use different gas fuels. In yet other embodiments, the turbine system 12 may use different liquid fuels. Liquid fuel may include distillate oils, light crude, bio-liquid fuels, and other liquid fuels. Gas fuel may include natural gas and/or combustible gas(es) created as a byproduct of industrial processes which may or may not contain hydrogen gas. These combustible gases may be referred to as and include syngas, synthetic gas, synthetic natural gas, refinery off-gas, refinery flue gas, blast furnace gas, coke oven gas, or other combustible gases.

As depicted in the turbine system 12 (e.g., gas turbine engine 14), one or more fuel nozzles 20, 22 (e.g., primary fuel nozzle 20 and secondary fuel nozzle 22) intake a fuel supply (e.g., gas fuel and/or liquid fuel), mix the fuel with air, and distribute the air-fuel mixture into a combustor 24 in a suitable ratio for optimal combustion, emissions, fuel consumption, and power output. In certain embodiments, the combustor 24 includes one or more primary fuel nozzles 20 and one or more secondary fuel nozzles 22. The air-fuel mixture combusts in a chamber within the combustor 24, thereby creating hot pressurized exhaust gases. The combustor 24 directs the exhaust gases through a turbine 30 toward an exhaust outlet. As the exhaust gases pass through the turbine 30, the gases force turbine blades to rotate a shaft 32 along an axis of the turbine system 12. As illustrated, the shaft 32 may be connected to various components of the turbine system 12, including a compressor 34. The compressor 34 also includes blades coupled to the shaft 32. As the shaft 32 rotates, the blades within the compressor 34 also rotate, thereby compressing air from an air intake through the compressor 34 and into the fuel nozzles 20, 22 and/or combustors 24. The shaft 32 may also be connected to a load, such as an electrical generator 35 in an electrical power plant, for example. The load may include any suitable device capable of being powered by the rotational mechanical power output of the turbine system 12. As described in greater detail below, the compressor 34 may include a compressor discharge port configured to receive steam from a steam supply to increase the power output of the turbine system 12. In addition, air may be extracted from the compressor discharge port of the compressor 34 for purging the gas fuel circuit of the gas fuel system during liquid fuel operation by the gas turbine engine 14.

The fuel management system 10 provides a flow of both a gas fuel 36 and a liquid fuel 38 to the turbine system 12 (e.g., gas turbine engine 14). As illustrated, each supply of fuel 36 and 38 includes a main fuel line 40 and 42, respectively. In certain embodiments, the number of fuel lines 40, 42 may vary (e.g., 2 to 28 fuel lines).

Also, the fuel management system 10 includes the dual air and steam purge system 16 (e.g., gas fuel purge system) configured to purge the gas fuel line 40 (e.g., gas fuel circuit) during liquid fuel operation by the gas turbine engine 14. The purge system 16 includes one or more purge lines or circuits 48 coupled to gas fuel line 40 upstream of the fuel nozzles 20, 22 (and gas manifold). The purge system 16 is coupled to both a steam supply 50 and an air supply 52. The steam supply 50 may be provided by a boiler, heat recovery steam generator (HRSG), or other source. The air supply 52 may be extracted from the compressor discharge port of the compressor 34 or a standalone compressor. The purge system 16 is configured to sequentially purge the gas fuel circuit (e.g., gas fuel lines 40, fuel nozzles 20, 22, and the gas manifold) of the gas fuel system with air and steam. The purge system 16 is configured to operate in at least two different modes. During the first mode of operation during engine startup using liquid fuel 38, prior to steam injection (e.g., while the boiler warms up), the purge system 16 utilizes air extracted from the compressor discharge port of the compressor 34 to initially purge the gas fuel circuit of the gas fuel system as described in greater detail below. The purge system 16 operates in the first mode prior to steam parameters (e.g., temperature and pressure) meeting a steam injection permissive threshold (e.g., while the boiler warms up). The steam injection permissive threshold is a function of both temperature and pressure. The steam injection permissive threshold for temperature may range from approximately 250 to 425° C., while the pressure may range from approximately 3500 to 5500 kPa. During the second mode of operation during engine startup on liquid fuel 38 (and subsequent operation on liquid fuel 38), the purge system 16 utilizes steam, instead of air, to subsequently purge the gas fuel 36 from the gas fuel system as described in greater detail below. The purge system 16 operates in the second mode upon the steam parameters meeting the steam injection permissive threshold. In addition, during the second mode of operation steam is provided to the gas turbine engine 14 to augment the power output of the engine 14.

The fuel management system 10 includes the fuel controller 18 configured to control the supply of the gas fuel 36 to the turbine system 12, the supply of the liquid fuel 38 to the turbine system 12, and the transition between the use of the gas and liquid fuels 36, 38 for the turbine system 12. In addition, the controller 18 is configured to control the purge system 16 and the sequential purging of the gas fuel circuit of the gas fuel system with air and steam. The fuel controller 18 is coupled to the gas and liquid fuel supplies 36, 38 as well as other valves associated with the fuel management system 10 and the purge system 16 described in detail below. The fuel controller 18 includes logic (e.g., fuel transition control logic 54) configured to control the transition from the gas fuel 36 to the liquid fuel 38 and vice versa. The fuel controller 18 also includes logic (e.g., purge control logic 56) configured to control a purge sequence for purging the gas fuel circuit (e.g., gas fuel line 40) coupled to the multi-fuel gas turbine 14. The purge sequence includes sequentially purging the gas fuel circuit with air and steam as described below. The logic of the controller 18 may include instructions stored on a non-transitory tangible computer readable medium. As a result of this logic, the purge system 16 enables dual air and steam purging of the gas fuel circuit of the gas fuel system, while enabling the use of steam to augment the power output of the multi-fuel gas turbine engine 14. In addition, the purge system 16 avoids coking, backflow of combustion products into the gas fuel lines and fuel nozzles 20, 22, and faster deterioration of engine hardware.

Figure 2:
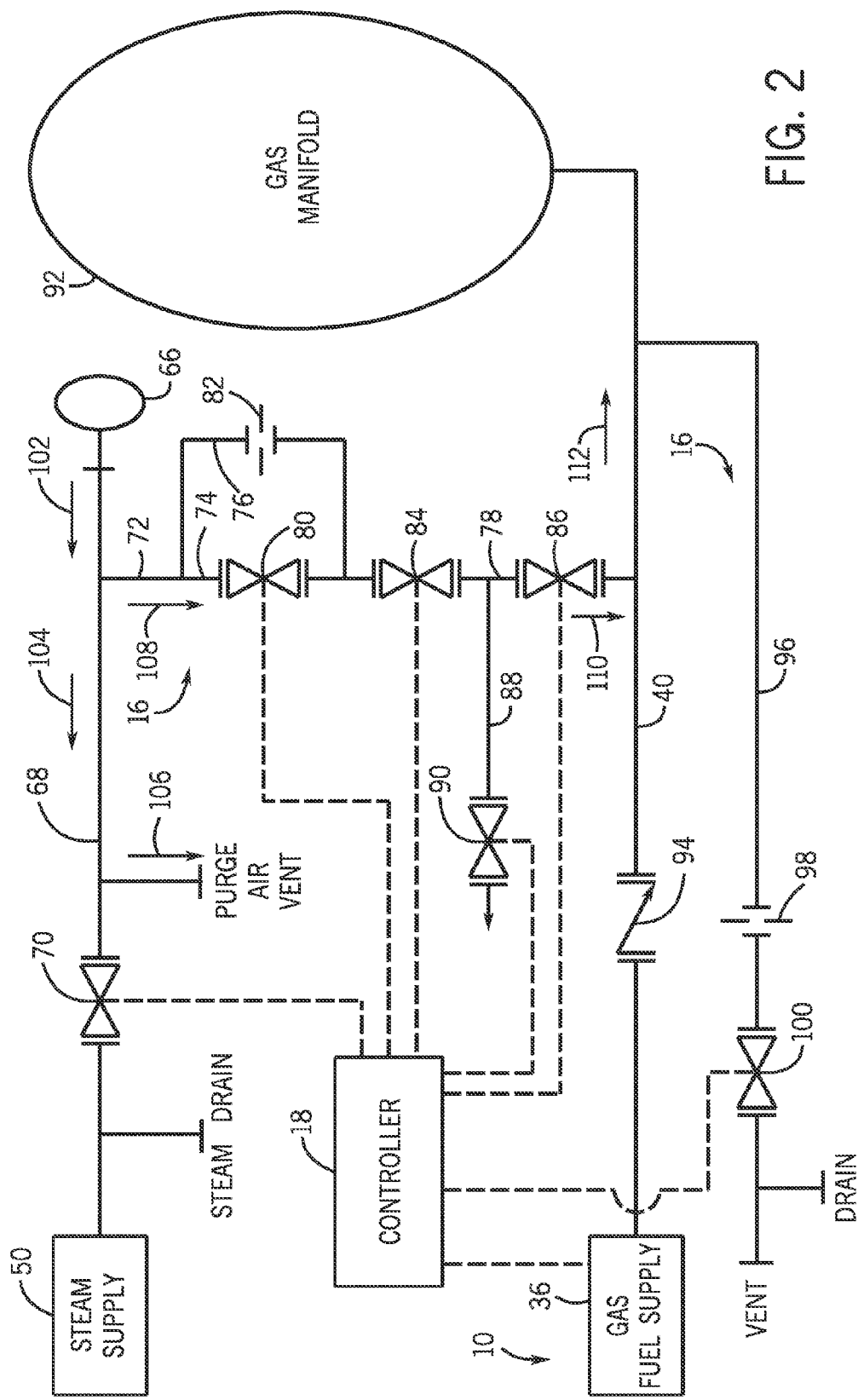
FIG. 2 is a schematic diagram of an embodiment of a portion of the fuel management system and the dual air and steam purge system for the turbine system in a first mode of operation with air (e.g., parallel purge circuits)

FIG. 2 is a schematic diagram of an embodiment of a portion of the fuel management system 10 and the dual air and steam purge system 16 (e.g., gas fuel purge system) for the turbine system 12 in a first mode of operation with air purging the gas fuel circuit of the gas fuel system. As illustrated, the steam supply 50 (e.g., provided by a boiler) is coupled to a manifold 66 (e.g. dual air and steam manifold) of the compressor discharge port of the compressor 34 via steam supply line 68. The steam supply line 68 includes a valve 70 (e.g., steam shutoff valve) configured to enable or restrict flow along the steam supply line 68 to the manifold 66 of the compressor discharge port.

The purge system 16 includes a line 72 (e.g., purge circuit) coupled to the steam supply line 68 between the valve 70 and the manifold 66. The line 72 splits into parallel purge lines or circuits (i.e., partially independent circuits), air purge circuit 74 and steam purge circuit 76, before the circuits 74 and 76 form a common line or purge circuit 78 that couples or ties in to the gas fuel line 40. In certain embodiments, the diameter of the air purge circuit 74 is greater than the diameter of the steam purge circuit 76. The air purge circuit 74 includes a valve 80 (e.g., purge air valve) to enable or restrict flow of air along the air purge circuit 74 to the common purge circuit 78. The steam purge circuit 76 includes an orifice 82 (e.g., purge steam orifice) configured to restrict the flow of steam along the steam purge circuit 76 to the common purge circuit 78. In certain embodiments, the steam purge circuit may include an adjustable valve instead of the orifice 82 to restrict the flow of steam along the steam purge circuit 76 to the common purge circuit 78. The common purge circuit 78 includes a pair of valves 84 and 86 (e.g., block valves) configured to enable or restrict flow of air or steam along the common purge circuit 78 to the gas fuel line 40. A line 88 (e.g., bleed line) is coupled to the common purge circuit 78 between the valves 84 and 86. The line 88 includes a valve 90 (e.g., bleed valve) that is normally open to bleed off of any backflow of combustible fluids. Together, the valves 84 and 86 and bleed valve system are configured to reduce or eliminate any possible combustible fluid leakage into the manifold 66 of the compressor discharge port during gas fuel operation by the gas turbine engine 14.

As mentioned above, the common purge circuit 78 is coupled to the gas fuel line 40. The fuel management system 10 provides gas fuel 36 to a gas manifold 92 of the gas turbine engine 14 via the gas fuel line 40. The gas fuel line 40 may include one or more valves configured to control the flow of the gas fuel 36 to the gas manifold 92. During purge operation, the one or more valves are closed. Upstream of the coupling of the gas fuel line 40 and the common purge circuit 78, the gas fuel line 40 includes a valve 94 (e.g., check valve) configured to block the backflow of gas fuel 36 or the flow of air or gas to the gas fuel supply 36.

The purge system 16 also includes a drain line 96 coupled to the gas fuel line 40 between the gas manifold 92 (e.g., at a low point of the gas fuel line 40) and the connection between the common purge circuit 78 and the gas fuel line 40. The drain line 96 includes an orifice 98 in series with a valve 100 (e.g., shut off valve). The valve 100 is located downstream of the orifice 98. The drain line 96 is configured to collect and drain any condensate formed from the steam during a steam purge operation. In addition, any steam may also be vented to another area via the drain line 96.

The controller 18, as described above, is coupled to and configured to open and close the valves 70, 80, 84, 86, 90, 100. By opening and closing the valves 70, 80, 84, 86, 90, 100, the controller 18 is able to control the purge system 16 and the sequential purging of the gas fuel circuit with air and steam via purge control logic 56 (e.g., instructions stored on a non-transitory tangible computer readable medium) as well as control providing steam to the gas turbine engine 14 via the manifold 66. In addition, the controller 18 regulates the transition from the gas fuel 36 to the liquid fuel 38 and vice versa via the fuel transition control logic 54.

As mentioned above, prior to the steam parameters meeting the steam injection permissive threshold, the purge system 16 (via the controller 18) is configured (during a first mode of operation) to initially purge the gas fuel circuit with air upon starting the turbine system 12 on liquid fuel 38. Air is extracted from the manifold 66 of the compressor discharge port of the compressor 34 as indicated by arrow 102. A portion of the supplied air flows along the steam supply line 68 towards steam shut off valve 70 as indicated by arrow 104. During the first mode of operation, the steam shut off valve 70 is closed, thus, the air flowing along the steam supply line 68 towards the valve 70 may be drained as indicated by arrow 106. Any steam provided by the steam supply 50 is diverted to a steam drain when the valve is closed 70.

Another portion of air travels through line 72 to the air purge circuit 74 as indicated by arrow 108. Air flows along the path of least resistance, the air purge circuit 74, instead of the steam purge circuit 76 due to the orifice 82 disposed along the steam purge circuit 76. Air flow across the orifice 82 would result in higher a pressure drop than air flow along the air purge circuit 74. This design enables the purge system 16 to minimize the pressure drop and to enable a continuous air purge flow. The air continues to flow along the common purge circuit 78 through the open valves 84 and 86 with minimal pressure drop into gas fuel line 40 as indicated by arrow 110. The bleed valve 90 is closed while purging the gas fuel 36 with air. The air then flows along the gas fuel line 40, as indicated by arrow 112, to purge the gas fuel system (e.g., gas fuel lines 40, fuel nozzles 20, 22, and gas manifold 92) during liquid fuel operation of the gas turbine 14. The drain valve 100 is closed while purging the gas fuel circuit with air to block any possible leakage and pressure loss. A low pressure differential exists between the source of air (e.g., manifold 66) and the gas fuel nozzle sink. The above configuration of the purge system 16 maintains a continuous flow of air and minimizes pressure drops during air purge operation to remain below differential pressure limits.

Figure 3:
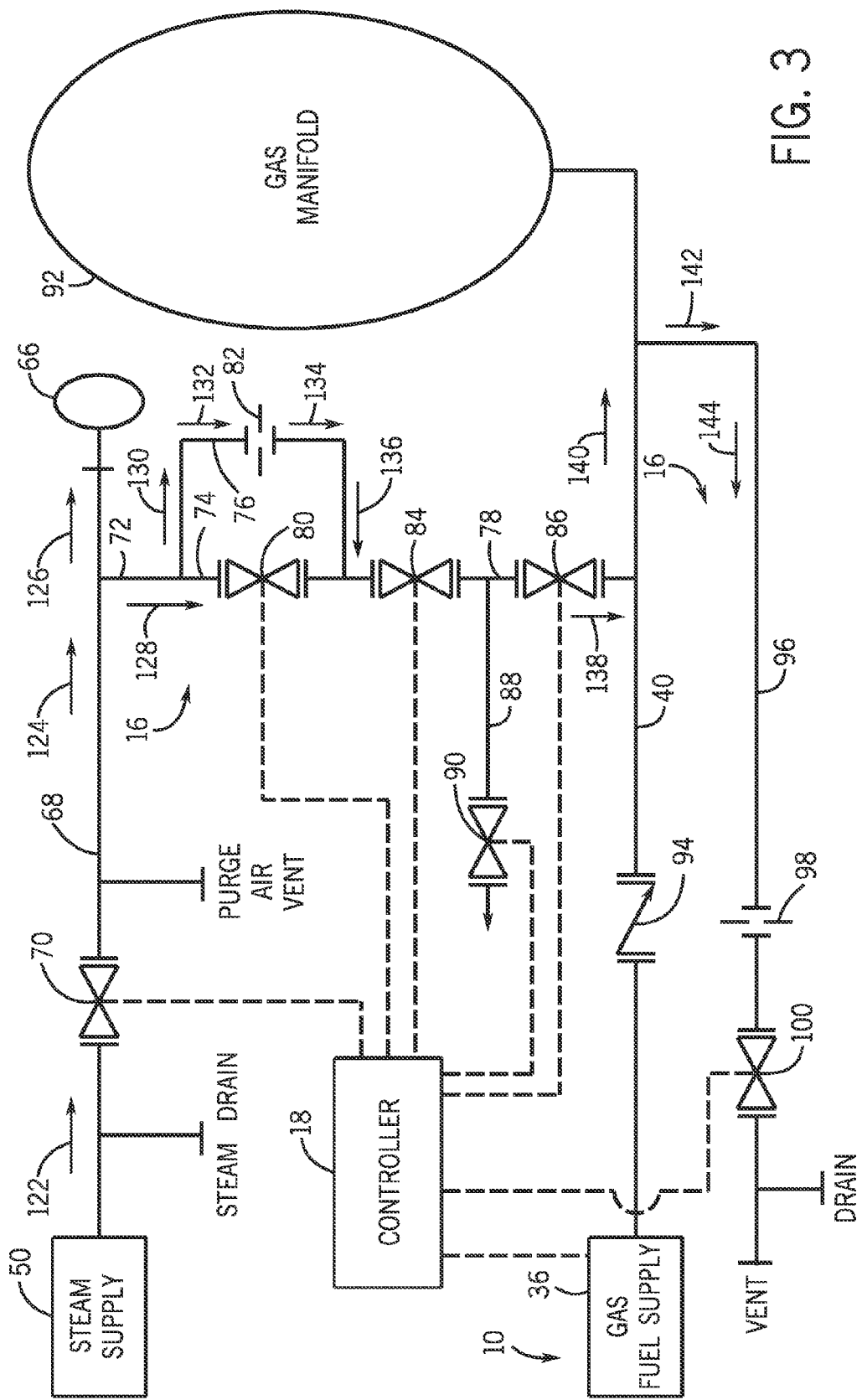
FIG. 3 is a schematic diagram of an embodiment of a portion of the fuel management system and the dual air and steam purge system for the turbine system in a second mode of operation with steam (e.g., parallel purge circuits)

Once the steam injection threshold permissive is met, the purge system 16 (via the controller 18) shifts to a second mode of operation with steam, instead of air, purging the gas fuel circuit of the gas fuel system as illustrated in FIG. 3. The steam injection permissive threshold is a function of both temperature and pressure. The steam injection permissive threshold for temperature may range from approximately 250 to 425° C. or 315 to 375° C., while the pressure may range from approximately 3500 to 5500 kPa or 4170 to 4500 kPa. For example, the purge system 16 may shift to the second mode of operation upon the temperature equaling or being greater than approximately 315, 320, 325, 330, 335, 340, 345, 350, 355, 360, 365, 370, or 370° C., or any other temperature and/or the pressure equaling or being greater than approximately 4170, 4200, 4250, 4300, 4350, 4400, 4450, or 4500 kPa or any other pressure.

As illustrated, steam flows from the steam supply 50 (e.g., generated by a boiler), as indicated by arrow 122, and flows through an open valve 70 along the steam supply line 68 as indicated by arrow 124. A large portion (i.e., first portion) of the steam (e.g., greater than approximately 90 percent of the total steam) flows toward the manifold 66 of the compressor discharge port of the compressor 34 as indicated by arrow 126. In some embodiments, the first portion of steam that flows toward the manifold 66 may range from approximately 70 to 99 percent of the total steam. The steam that flows into the manifold 66 augments the power output of the turbine engine 14. The steam flowing towards the manifold 66 overcomes the pressure of any air that may flow into the steam supply line 68 from the manifold 66. A smaller portion (i.e., second portion) of the steam (e.g., less than approximately 10 percent of the total steam) flows through line 72 as indicated by arrow 128 to the steam purge circuit 76 as indicated by arrows 130, 132. Maintaining a continuous fluid flow within the gas circuit via the steam minimizes the chance of recirculation of combustible fluids back into the gas fuel circuit. In some embodiments, the second portion of steam that flows through line 72 to the steam purge circuit 76 may range from approximately 1 to 30 percent of the total steam. The purge air valve 80 of the air purge circuit 74 is closed diverting flow of the steam through the steam purge circuit 76. The orifice 82 disposed along the steam purge circuit 76 restricts the amount of flow of steam to purge the gas fuel circuit of the gas fuel system. By restricting the flow of steam, the orifice 82 ensures the greater portion of the steam flows toward the manifold 66.

Some of the steam crosses the orifice 82 along the air purge circuit 76, as indicated by arrows 134, 136, toward the common purge circuit 78. The steam continues to flow along the common purge circuit 78 through the open valves 84, 86 with minimal pressure drop into the gas fuel line 40 as indicated by arrow 138. The bleed valve 90 is closed while purging the gas fuel 36 with steam. The steam then flows along the gas fuel line 40, as indicated by arrow 140, to purge the gas fuel circuit of the gas fuel system (e.g., gas fuel line 40, fuel nozzles 20 and 22, and gas manifold 92) during liquid fuel operation by the gas turbine 14. The drain valve 100 is open while purging the gas fuel circuit with steam to collect and drain any condensate that forms within the gas line 40 from the steam. Steam flows along the drain line 96 as indicated by arrows 142, 144. The orifice 98 disposed along the drain line 96 restricts the flow of steam towards the valve 100 and venting area. By restricting the flow of steam, the orifice 98 ensures the greater portion of the steam flows toward the gas manifold 92. As designed in FIGS. 2 and 3, the purge system 16 enables dual air and steam purging of the gas fuel circuit of the gas fuel system, while enabling the use of steam to augment the power output of the multi-fuel gas turbine engine 14. In addition, the purge system 16 generally reduces or eliminates coking, backflow of combustion products into the gas fuel line 40 and fuel nozzles 20, 22, and faster deterioration of engine hardware.

Figure 4:
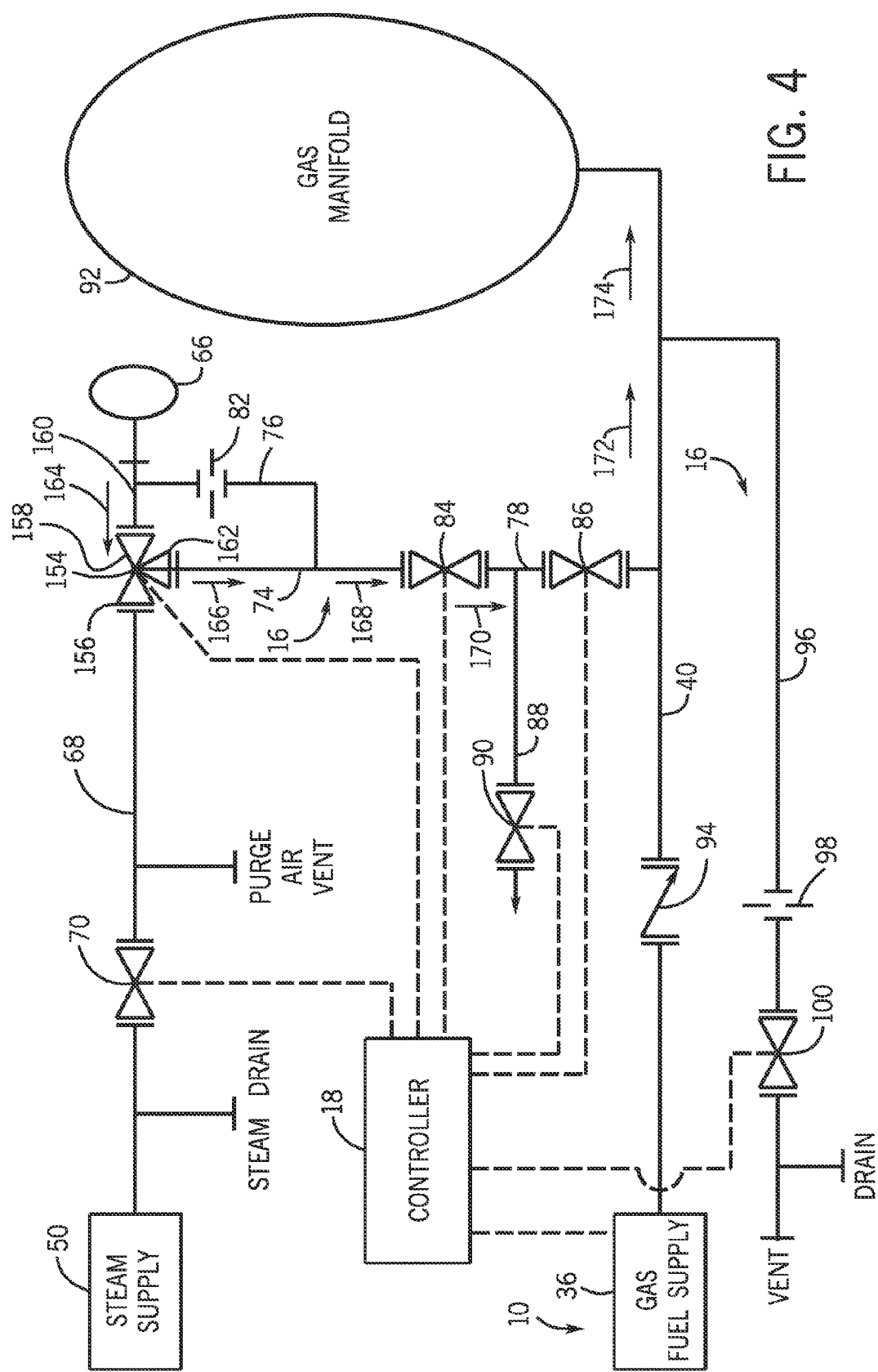
FIG. 4 is a schematic diagram of an embodiment of a portion of the fuel management system and the dual air and steam purge system for the turbine system in a first mode of operation with air (e.g., partially independent purge circuits and three-way valve)
Figure 5:
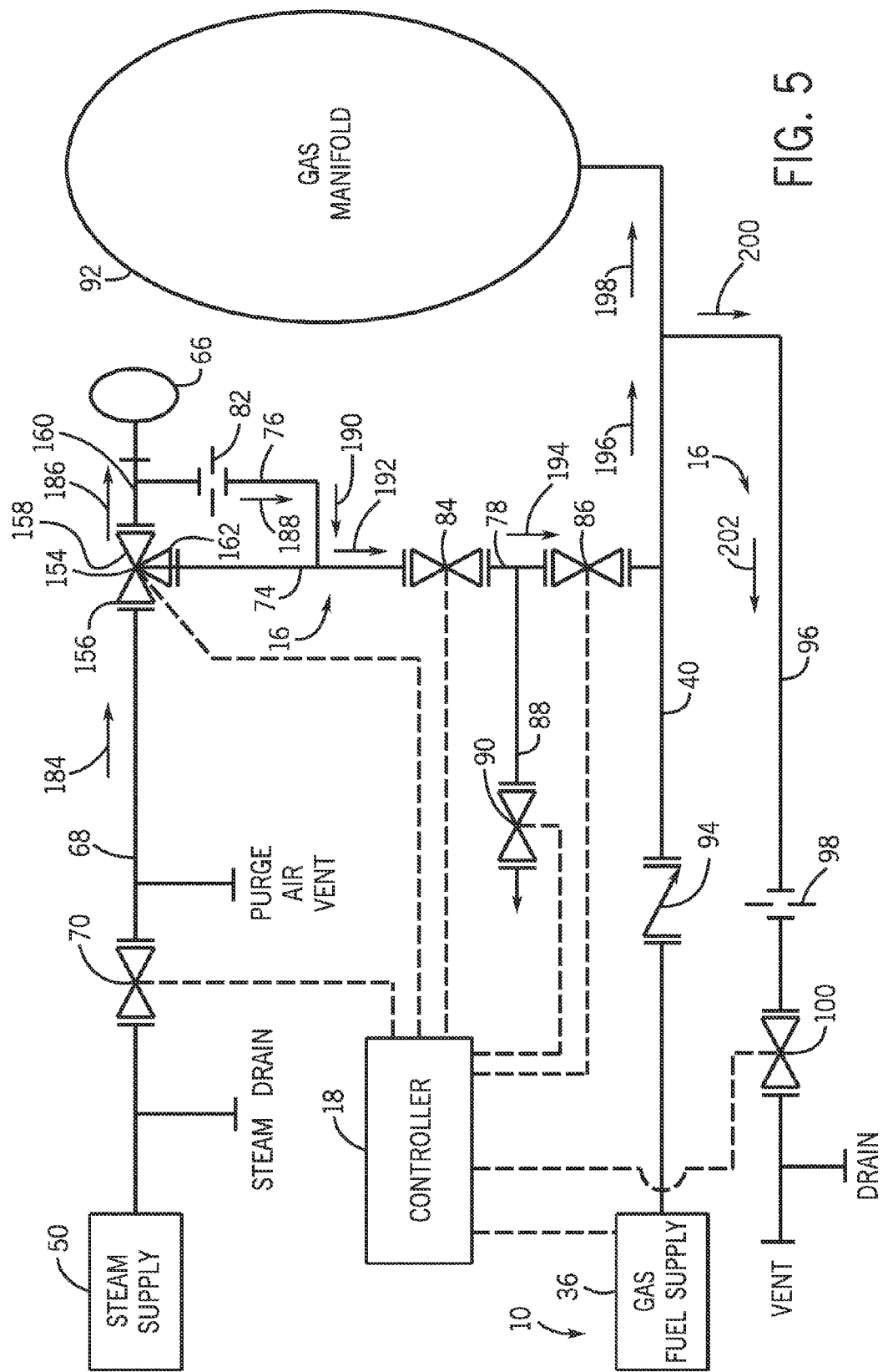
FIG. 5 is a schematic diagram of an embodiment of a portion of the fuel management system and the dual air and steam purge system for the turbine system in a second mode of operation with steam (e.g., partially independent purge circuits and three-way valve)

FIGS. 4 and 5 illustrate an embodiment of the purge system 16 that includes a three-way valve 154 configured to enable whether the gas fuel line 40 is purged with air or steam. FIG. 4 is a schematic diagram of an embodiment of a portion of the fuel management system 10 and the dual air and steam purge system 16 for the turbine system 12 in a first mode of operation with air purging the gas fuel circuit of the gas fuel system. Structurally, the fuel management system 10 and most of the purge system 16 are as described above in FIGS. 2 and 3 except for a portion of the purge system 16. For example, the purge system 16 includes the three-way valve 154 and lacks the purge air valve 80. In addition, the air purge circuit 74 and the steam purge circuit 76 are configured differently.

The purge system 72 includes the air purge circuit 74 and the steam purge circuit 76 separately coupled to the steam supply line 68. The three-way valve 154 is disposed along the steam supply line 68 at the connection between the air purge circuit 74 and the line 68. The three-way valve 154 includes a first port 156 that interfaces with the steam supply line 68, a second port 158 that interfaces with a line 160 (e.g., air supply line) from the manifold 66 of the compressor discharge port, and a third port 162 that interfaces with the air purge circuit 74. The steam purge circuit 76 couples to the line 160 between the three-way valve 154 and the manifold 66 of the compressor discharge port of the compressor 34. The air purge circuit 74 and the steam purge circuit 76 form parallel purge lines or circuits (i.e., partially independent circuits) that converge into a common line or purge circuit 78 that couples or ties in to the gas fuel line 40. In certain embodiments, the diameter of the air purge circuit 74 is greater than the diameter of the steam purge circuit 76. The steam purge circuit 76 includes the orifice 82 (e.g., purge steam orifice) configured to restrict the flow of steam along the steam purge circuit 76 to the common purge circuit 78. In certain embodiments, the steam purge circuit may include an adjustable valve instead of the orifice 82 to restrict the flow of steam along the steam purge circuit 76 to the common purge circuit 78. The common purge circuit 78 is as described above.

The controller 18, as described above, is coupled to and configured to open and close the valves 70, 154 (ports 156, 158, 162), 84, 86, 90, 100. By opening and closing the valves 70, 154 (ports 156, 158, 162), 84, 86, 90, 100, the controller 18 is able to control the purge system 16 and the sequential purging of the gas fuel circuit with air and steam via purge control logic 56 (e.g., instructions stored on a non-transitory tangible computer readable medium) as well as control providing steam to the gas turbine engine 14 via the manifold 66. In addition, the controller 18 regulates the transition from the gas fuel 36 to the liquid fuel 38 and vice versa via the fuel transition control logic 54.

As mentioned above, prior to meeting the steam injection permissive threshold, the purge system 16 (via the controller 18) is configured during a first mode of operation to initially purge the gas fuel circuit with air upon starting the turbine system 12 on liquid fuel 38. Any steam provided from the steam supply 50 is diverted to the steam drain when the valve 70 is closed. Air is extracted from the manifold 66 of the compressor discharge port of the compressor 34 as indicated by arrow 164. The supplied air flows along the air supply line 160 towards the three-way valve 154 as indicated by arrow 164. During the first mode of operation, the first port 156 of the three-way valve 154 is closed, while the second and third ports 158, 162 are open. The air travels through the ports 158, 162 into the air purge circuit 74 as indicated by arrow 166. Air flows along the path of least resistance, the air purge circuit 74, instead of the steam purge circuit 76 due to the orifice 82 disposed along the steam purge circuit 76. Air flow across the orifice 82 would result in higher a pressure drop than air flow along the air purge circuit 74. This design enables the purge system 16 to minimize the pressure drop and to enable a continuous air purge flow. The air continues to flow along the common purge circuit 78 through the open valves 84, 86 with minimal pressure drop into gas fuel line 40 as indicated by arrows 168, 170. The bleed valve 90 is closed while purging the gas fuel circuit with air. The air then flows along the gas fuel line 40, as indicated by arrows 172, 174, to purge the gas fuel circuit of the gas fuel system (e.g., gas fuel lines 40, fuel nozzles 20 and 22, and gas manifold 66) during liquid fuel operation by the gas turbine 14. The drain valve 100 is closed while purging the gas fuel 36 with air to reduce or eliminate any possible leakage and pressure loss. A low pressure differential exists between the source of air (e.g., manifold 66) and the gas fuel nozzle sink. The above configuration of the purge system 16 maintains a continuous flow of air and minimizes pressure drops during air purge operation to remain below differential pressure limits.

Once the steam injection threshold permissive is met, the purge system 16 (via the controller 18) shifts to a second mode of operation with steam, instead of air, purging the gas fuel 36 from the gas fuel system as illustrated in FIG. 5. The steam injection permissive threshold is a function of both temperature and pressure. The steam injection permissive threshold for temperature may range from approximately 250 to 425° C. or 315 to 375° C., while the pressure may range from approximately 3500 to 5500 kPa or 4170 to 4500 kPa. For example, the purge system 16 may shift to the second mode of operation upon the temperature equaling or being greater than approximately 315, 320, 325, 330, 335, 340, 345, 350, 355, 360, 365, 370, or 370° C., or any other temperature and/or the pressure equaling or being greater than approximately 4170, 4200, 4250, 4300, 4350, 4400, 4450, or 4500 kPa or any other pressure.

During the second mode of operation as illustrated in FIG. 5, the first and second ports 156, 158 of the three-way valve 154 are open, while the third port 162 is closed. As illustrated, steam flows from the steam supply 50 (e.g., generated by a boiler) along the steam supply line 68 through the open valve 70 as indicated by arrow 184 and flows through open ports 156, 158 into the line 160 as indicated by arrow 186. A large portion (i.e., first portion) of the steam (e.g., greater than approximately 90 percent of the total steam) flows toward the manifold 66 of the compressor discharge port of the compressor 34 as indicated by arrow 186. In some embodiments, the first portion of steam that flow toward the manifold 66 may range from approximately 70 to 99 percent of the total steam. The steam flowing towards the manifold 66 overcomes the pressure of any air that may flow into the line 160 from the manifold 66. The steam that flows into the manifold 66 augments the power output of the turbine engine 14. A smaller portion (i.e., second portion) of the steam (e.g., less than approximately 10 percent of the total steam) flows into the steam purge circuit 76 as indicated by arrow 188. Maintaining a continuous fluid flow within the gas circuit via the steam minimizes the change of recirculation of combustible fluids back into the gas fuel circuit. In some embodiments, the second portion of steam that flows into the steam purge circuit 76 may range from approximately 1 to 30 percent of the total steam. The third port 162 of the three-way valve 162 is closed diverting flow of the steam through the steam purge circuit 76. The orifice 82 disposed along the steam purge circuit 76 restricts the amount of flow of steam to purge the gas fuel circuit of the gas fuel system. By restricting the flow of steam, the orifice 82 ensures the greater portion of the steam flows toward the manifold 66.

Some of the steam crosses the orifice 82 along the air purge circuit 76, as indicated by arrows 188, 190, toward the common purge circuit 78. The steam continues to flow along the common purge circuit 78 through the open valves 84, 86 with minimal pressure drop into the gas fuel line 40 as indicated by arrows 192, 194. The bleed valve 90 is closed while purging the gas fuel circuit with steam. The steam then flows along the gas fuel line 40, as indicated by arrows 196, 198, to purge the gas fuel circuit of the gas fuel system (e.g., gas fuel lines 40, fuel nozzles 20, 22, and gas manifold 92) during liquid fuel operation by the gas turbine 14. The drain valve 100 is open while purging the gas fuel circuit with steam to collect and drain any condensate that forms within the gas line 40 from the steam. Steam flows along the drain line 96 as indicated by arrows 200, 202. The orifice 98 disposed along the drain line 96 restricts the flow of steam towards the valve 100 and venting area. By restricting the flow of steam, the orifice 98 ensures the greater portion of the steam flows toward the gas manifold 92. As designed in FIGS. 4 and 5, the purge system 16 enables dual air and steam purging of the gas fuel circuit of the gas fuel system, while enabling the use of steam to augment the power output of the multi-fuel gas turbine engine 14. In addition, the purge system 16 reduces or eliminates coking, backflow of combustion products into the gas fuel line 40 and fuel nozzles 20, 22, and faster deterioration of engine hardware.

Figure 6:
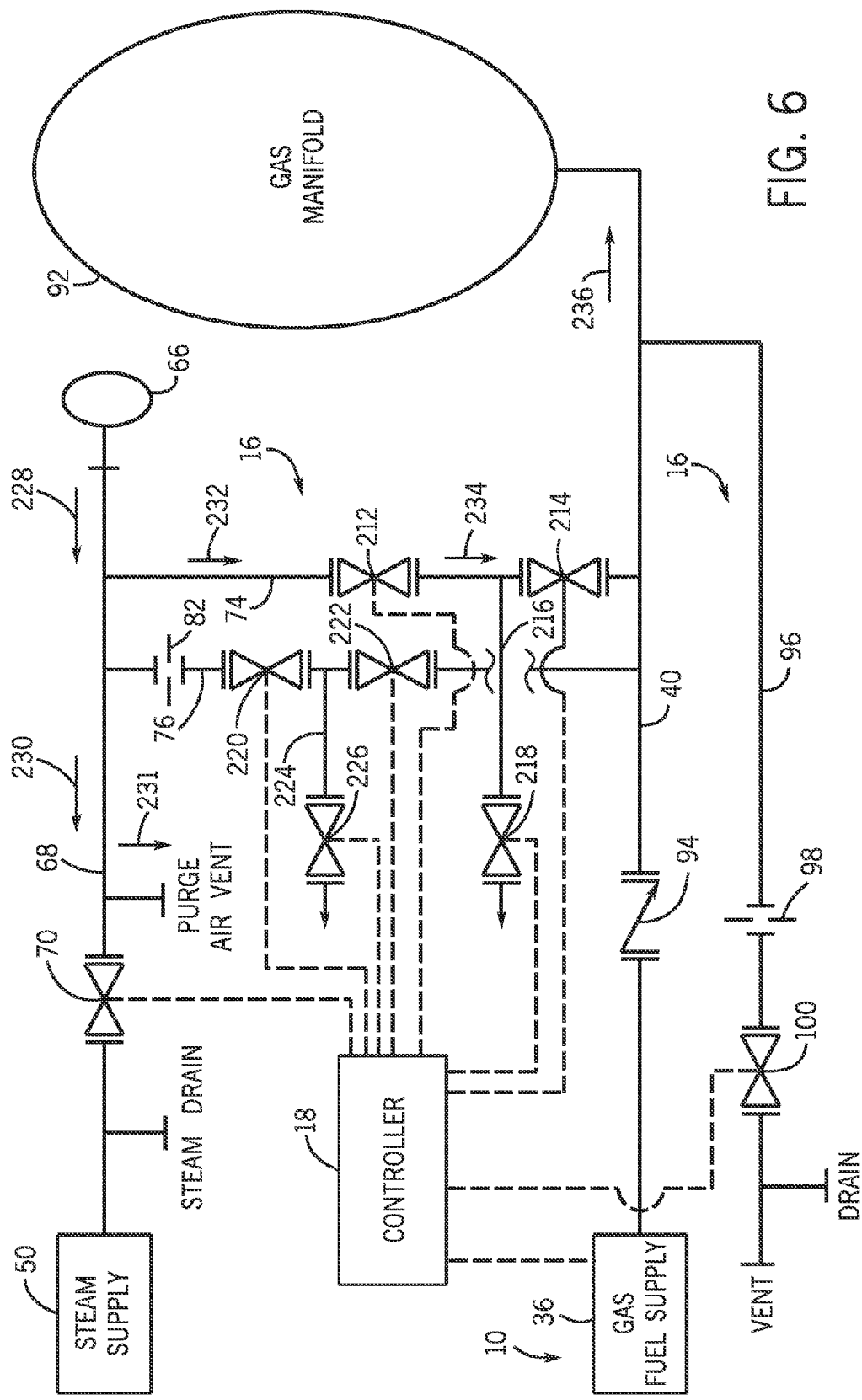
FIG. 6 is a schematic diagram of an embodiment of a portion of the fuel management system and the dual air and steam purge system for the turbine system in a first mode of operation with air (e.g., completely independent purge circuits)
Figure 7:
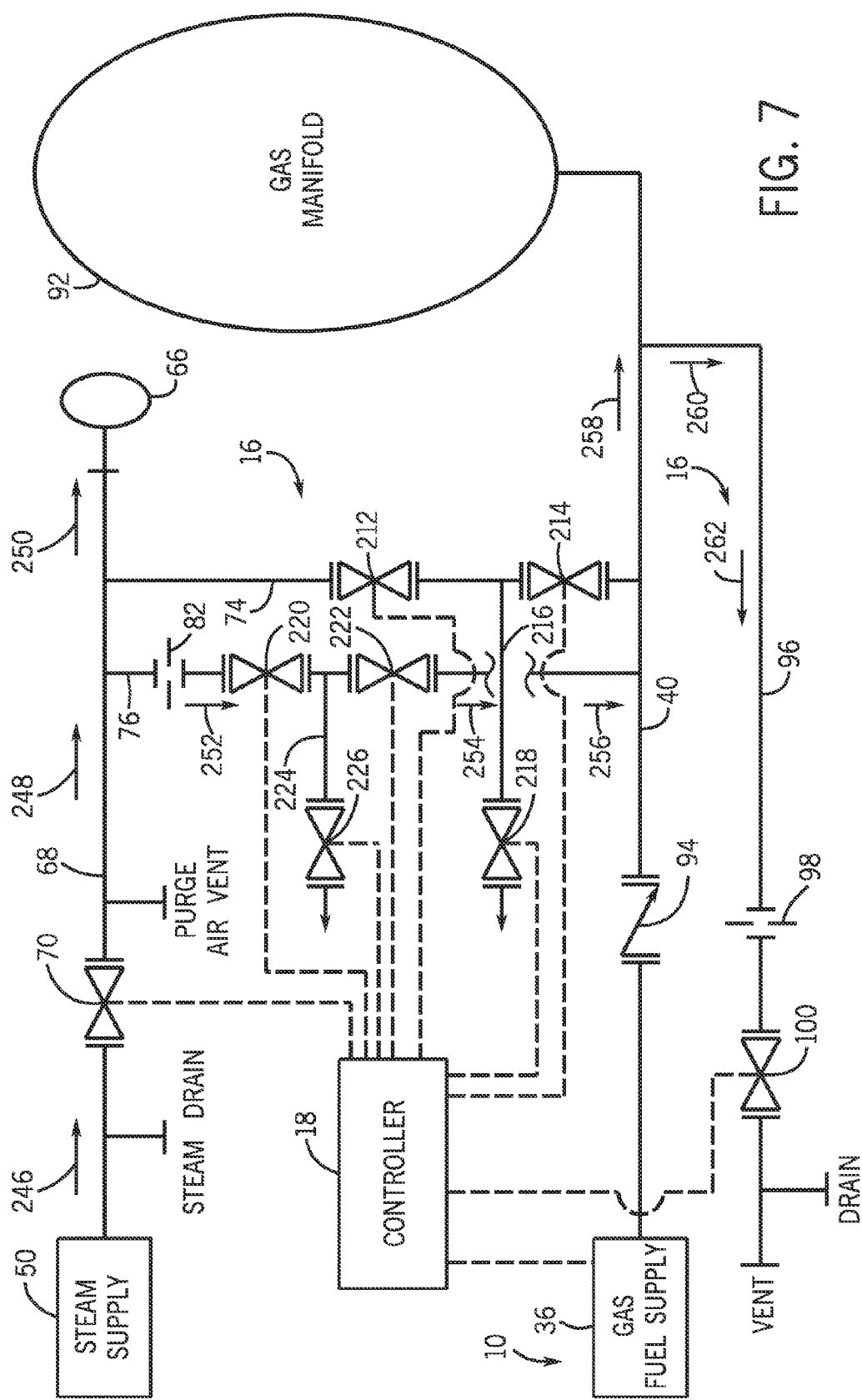
FIG. 7 is a schematic diagram of an embodiment of a portion of the fuel management system and the dual air and steam purge system for the turbine system in a second mode of operation with steam (e.g., completely independent purge circuits)

Besides parallel air and steam purge circuits 74, 76 that converge into the common purge circuit 78, the purge system 16 may include completely independent air and steam purge circuits 74, 76 as illustrated in FIGS. 6 and 7. FIG. 6 is a schematic diagram of an embodiment of a portion of the fuel management system 10 and the dual air and steam purge system 16 for the turbine system 12 in a first mode of operation with air purging the gas fuel circuit of the gas fuel system. Structurally, components along the steam supply line 68, the gas fuel line 40, and the drain line 96 are as described above in FIGS. 2 and 3, except the purge system 16 includes completely independent air and steam purge circuits 74, 76 that do not merge into the common purge circuit 78.

The purge system 16 includes the air and purge circuits 74, 76 independently coupled to the steam supply line 68 between the valve 70 and the manifold 66 and extending to the gas supply line 40. The air and steam purge circuits 74, 76 are coupled to the steam supply line 68 near the manifold 66 of the compressor discharge port and the steam supply 50, respectively. The air purge circuit 74 includes a pair of valves 212 and 214 (e.g., block valves) configured to enable or restrict flow of air to the gas fuel line 40. A line 216 (e.g., bleed line) is coupled to the air purge circuit 74 between the valves 212 and 214. The line 216 includes a valve 218 (e.g., purge air bleed valve) that enables bleed off of any air during steam purge operation. The valve 218 is closed during air purge operation and open during steam purge operation. Together, the valves 212 and 214 and bleed valve system are configured to block any possible combustible fluid leakage into the manifold 66 of the compressor discharge port during gas fuel operation of the gas turbine engine 14.

The steam purge circuit 76 includes the orifice 82 (e.g., purge steam orifice) configured to restrict the flow of steam along the steam purge circuit 76. In certain embodiments, the steam purge circuit 76 includes an adjustable valve instead of the orifice 82. Downstream of the orifice 82, the steam purge circuit 76 includes a pair of valves 220 and 222 (e.g., block valves) configured to enable or restrict flow of steam to the gas fuel line 40. A line 224 (e.g., bleed line) is coupled to the steam purge circuit 76 between the valves 220 and 222. The line 224 includes a valve 226 (e.g., purge steam bleed valve) that enables bleed off of any steam during air purge operation. The valve 226 is closed during steam purge operation and open during air purge operation. Together, the valves 220 and 222 and bleed valve system are configured to block any possible combustible fluid leakage into the manifold 66 of the compressor discharge port during gas fuel operation of the gas turbine engine 14.

The controller 18, as described above, is coupled to and configured to open and close the valves 70, 212, 214, 218, 220, 222, 226, 100. By opening and closing the valves 70, 212, 214, 218, 220, 222, 226, 100, the controller 18 is able to control the purge system 16 and the sequential purging of the gas fuel 36 with air and steam via purge control logic 56 (e.g., instructions stored on a non-transitory tangible computer readable medium) as well as control providing steam to the gas turbine engine 14 via the manifold 66. In addition, the controller 18 regulates the transition from the gas fuel 36 to the liquid fuel 38 and vice versa via the fuel transition control logic 54.

As mentioned above, prior to meeting the steam injection permissive threshold, the purge system 16 (via the controller 18) is configured (during a first mode of operation) to initially purge the gas fuel circuit with air upon starting the turbine system 12 on liquid fuel 38. Air is extracted from the manifold 66 of the compressor discharge port of the compressor 34 as indicated by arrow 228. A portion of the supplied air flows along the steam supply line 68 towards steam shut off valve 70 as indicated by arrow 230. During the first mode of operation, the steam shut off valve 70 is closed, thus, the air flowing along the steam supply line 68 towards the valve 70 may be drained as indicated by arrow 231. Any steam 50 provided by the steam supply is diverted to a steam drain when the valve is closed 70.

Another portion of air travels through line 68 to the air purge circuit 74 as indicated by arrow 232. Air flows along the path of least resistance, the air purge circuit 74, instead of the steam purge circuit 76 due to the orifice 82 disposed along the steam purge circuit 76. Air flow across the orifice 82 would result in higher a pressure drop than air flow along the air purge circuit 74. This design enables the purge system 16 to minimize the pressure drop and to enable a continuous air purge flow. The air continues to flow along the air purge circuit 74 through the open valves 212, 214 with minimal pressure drop into gas fuel line 40 as indicated by arrows 232, 234. As mentioned above, the bleed valve 218 is closed, while purging the gas fuel 36 with air. Also, the bleed valve 226 is open, while purging the gas fuel circuit with air. The air then flows along the gas fuel line 40, as indicated by arrow 236, to purge the gas fuel system (e.g., gas fuel lines 40, fuel nozzles 20, 22, and gas manifold 92) during liquid fuel operation of the gas turbine 14. The drain valve 100 is closed while purging the gas fuel circuit with air to block any possible leakage and pressure loss. A low pressure differential exists between the source of air (e.g., manifold 66) and the gas fuel nozzle sink. The above configuration of the purge system 16 maintains a continuous flow of air and minimizes pressure drops during air purge operation to remain below differential pressure limits.

Once the steam injection threshold permissive is met, the purge system 16 (via the controller 18) shifts to a second mode of operation with steam, instead of air, purging the gas fuel circuit of the gas fuel system as illustrated in FIG. 7. The steam injection permissive threshold is function of both temperature and pressure. The steam injection permissive threshold for temperature may range from approximately 250 to 450° C. or 315 to 375° C., while the pressure may range from approximately 3500 to 5500 kPa or 4170 to 4500 kPa. For example, the purge system 16 may shift to the second mode of operation upon the temperature equaling or being greater than approximately 315, 320, 325, 330, 335, 340, 345, 350, 355, 360, 365, 370, or 370° C., or any other temperature and/or the pressure equaling or being greater than approximately 4170, 4200, 4250, 4300, 4350, 4400, 4450, or 4500 kPa or any other pressure.

As illustrated, steam flows from the steam supply 50 (e.g., generated by a boiler), as indicated by arrow 246, and flows through an open valve 70 along the steam supply line 68 as indicated by arrow 248. A large portion (i.e., first portion) of the steam (e.g., greater than approximately 90 percent of the total steam) flows toward the manifold 66 of the compressor discharge port of the compressor 34 as indicated by arrow 250. In some embodiments, the first portion of steam that flow toward the manifold 66 may range from approximately 70 to 99 percent of the total steam. The steam that flows into the manifold 66 augments the power output of the turbine engine 14. A smaller portion (i.e., second portion) of the steam (e.g., less than approximately 10 percent of the total steam) flows into the steam purge circuit 76 as indicated by arrow 252. Maintaining a continuous fluid flow within the gas circuit via the steam prevents recirculation of combustible fluids back into the gas fuel circuit. In some embodiments, the second portion of steam that flows into the steam purge circuit 76 may range from approximately 1 to 30 percent of the total steam. The orifice 82 disposed along the steam purge circuit 76 restricts the amount of flow of steam to purge the gas fuel circuit of the gas fuel system. By restricting the flow of steam, the orifice 82 ensures the greater portion of the steam flows toward the manifold 66.

Some of the steam crosses the orifice 82 along the steam purge circuit 76, as indicated by arrow 252. The steam continues to flow along the steam purge circuit 76 through the open valves 220, 222 with minimal pressure drop into the gas fuel line 40 as indicated by arrows 254, 256. As mentioned above, the bleed valve 218 is open, while purging the gas fuel circuit with air. Also, the bleed valve 226 is closed, while purging the gas fuel circuit with air. The steam then flows along the gas fuel line 40, as indicated by arrow 258, to purge the gas fuel circuit of the gas fuel system (e.g., gas fuel lines 40, fuel nozzles 20, 22, and gas manifold 92) during liquid fuel operation by the gas turbine 14. The drain valve 100 is open while purging the gas fuel circuit with steam to collect and drain any condensate that forms within the gas line 40 from the steam. Steam flows along the drain line 96 as indicated by arrows 260, 262. The orifice 98 disposed along the drain line 96 restricts the flow of steam towards the valve 100 and venting area. By restricting the flow of steam, the orifice 98 ensures the greater portion of the steam flows toward the gas manifold 92. As designed in FIGS. 6 and 7, the purge system 16 enables dual air and steam purging of the gas fuel circuit of the gas fuel system, while enabling the use of steam to augment the power output of the multi-fuel gas turbine engine 14. In addition, the purge system 16 reduces or eliminates coking, backflow of combustion products into the gas fuel lines 40 and fuel nozzles 20, 22, and faster deterioration of engine hardware.

Figure 8:
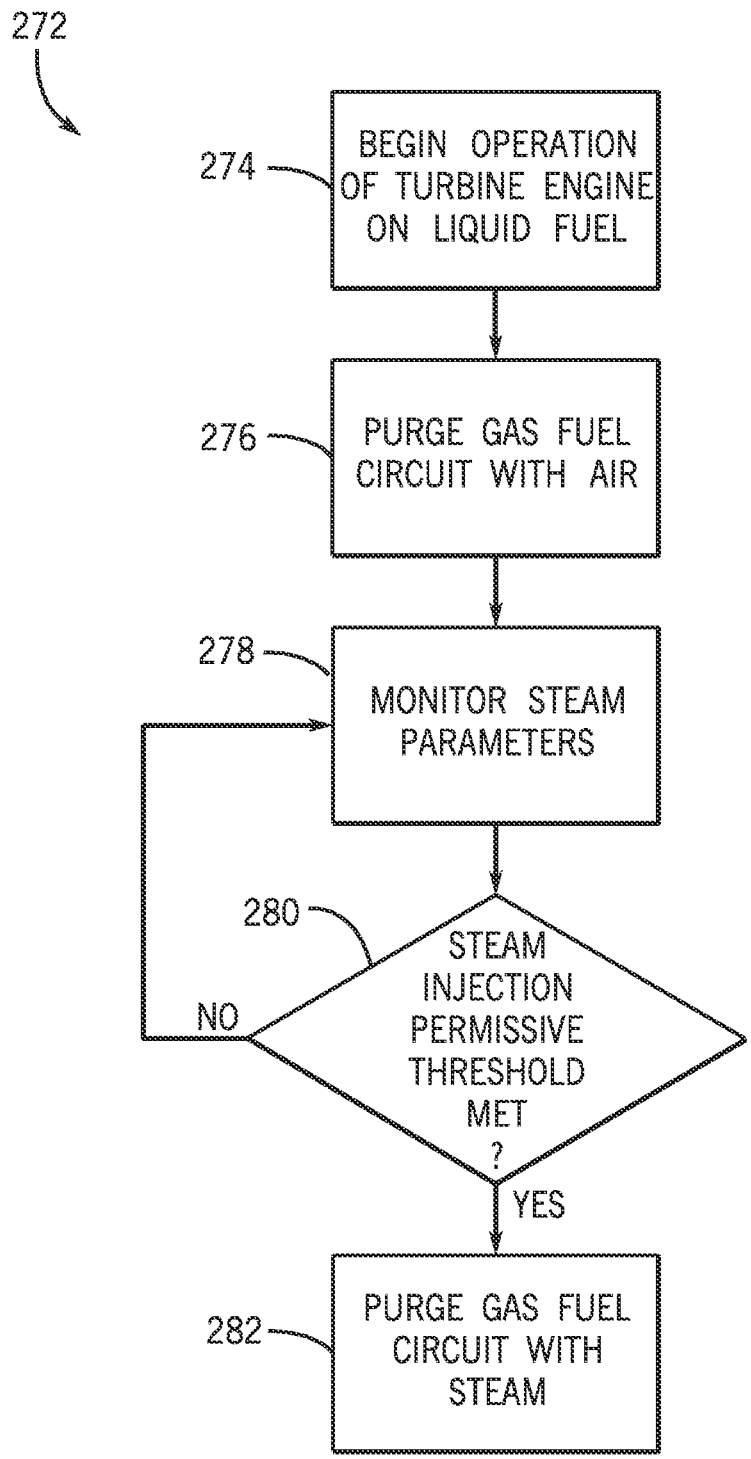
FIG. 8 is a flow chart of an embodiment of a process for purging a gas fuel circuit of a gas fuel system of the turbine system.

Employment of the above embodiments of the purge system 16 referenced in FIGS. 1-7 are described in the following process. FIG. 8 is a flow chart of an embodiment of a process 272 for purging the gas fuel circuit of the gas fuel system during liquid fuel operation of the gas turbine engine 14. In particular, the process 272 employs the purge sequence described above to enable dual air and steam purging of the gas fuel circuit of the gas fuel system, while enabling the use of steam to augment the power output of the multi-fuel gas turbine engine 14. In addition, the purge sequence reduces or eliminates coking, backflow of combustion products into the gas fuel line 40 and fuel nozzles, and faster deterioration of engine hardware. The fuel controller 18, as described above, implements the process 272.

The process 272 includes beginning the operation of the multi-fuel gas turbine engine 14 on liquid fuel 38 (block 274). While liquid fuel operation of the gas turbine engine begins (block 274), the purge system 16 (via the controller 18), while operating in the first mode, initially purges the gas fuel circuit of the gas fuel system (e.g., gas fuel lines 40, fuel nozzles 20, 22, and gas manifold) with air as described above (block 276). The first mode of purge operation with air occurs prior to the parameters (e.g., temperature and pressure) of the steam from the steam supply 50 meet the steam injection permissive threshold. The steam injection permissive threshold is a function of both temperature and pressure. The steam injection permissive threshold for temperature may range from approximately 250 to 425° C. or 315 to 375° C., while the pressure may range from approximately 3500 to 5500 kPa or 4170 to 4500 kPa. During air purge operation by the purge system 16, the controller 18 monitors parameters (e.g., temperature and pressure) of the steam (block 278). The controller 18 determines whether the steam parameters meet a steam injection permissive threshold (block 280). If the steam parameters do not meet the steam injection permissive threshold, the controller 18 continues to monitor the steam parameters (block 278). However, if the steam parameters do meet the steam injection permissive threshold, the purge system 16 (via the controller 18) shifts to operating in the second mode and purges the gas fuel circuit of the gas fuel system with steam instead of air (block 282). In addition, during the second mode, steam is provided to gas turbine engine 14 via the manifold 66 to augment the power output of the engine 14.

Technical effects of the disclosed embodiments include providing systems and methods for dual air and steam purging of gas fuel circuit of the gas fuel system during liquid fuel operation by the gas turbine engine 14. In particular, the disclosed embodiments include the dual air and steam purge system 16 (e.g., gas fuel purge system), via the controller 18 (e.g., using the purge control logic 56), configured to sequentially purge the gas fuel circuit with air and steam. Prior to meeting the steam injection permissive threshold, the purge system 16 initially purges the gas fuel circuit of the gas fuel system with air. Upon meeting the steam injection permissive threshold, the purge system 16 subsequently purges the gas fuel circuit of the gas fuel system with steam, while the gas turbine engine 14 is provided steam via the manifold 66 to augment the power output of the engine 14. The purge system 16 may include partially independent air and steam purge circuits 74, 76 that converge into the common purge circuit 78 or completely independent air and steam purge circuits 74, 76. The configuration of the purge system 16 maintains a continuous flow of fluid (e.g., air or steam) within the gas circuit of the gas fuel system. In addition, the purge system 16 enables dual air and steam purging of the gas fuel circuit of the gas fuel system, while enabling the use of steam to augment the power output of the multi-fuel gas turbine engine 14. In addition, the purge system 16 reduces or eliminates coking, backflow of combustion products into the gas fuel lines 40 and fuel nozzles 20, 22, and faster deterioration of engine hardware.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a multi-fuel gas turbine configured to operate on both a liquid fuel system and a gas fuel system, wherein the multi-fuel gas turbine comprises a compressor, a combustor, and a turbine; and
    a gas fuel purge system configured to purge a gas fuel circuit of the gas fuel system during liquid fuel operation of the gas turbine, wherein a controller is configured to control the gas fuel purge system to sequentially purge the gas fuel circuit initially with air by flowing the air through a gas manifold of the gas fuel circuit into the combustor prior to meeting a steam injection permissive threshold of temperature and subsequently, upon meeting the steam injection permissive threshold, purge the gas fuel circuit with steam by flowing the steam through the gas manifold into the combustor.

2. The system of claim 1, wherein the gas fuel purge system comprises an air purge circuit configured to purge the gas fuel circuit with the air and a steam purge circuit configured to purge the gas fuel circuit with the steam.

3. The system of claim 2, wherein the air purge circuit and the steam purge circuit are at least partially independent circuits.

4. The system of claim 2, wherein gas fuel purge system comprises a common purge circuit having the air purge circuit and the steam purge circuit.

5. The system of claim 3, wherein the gas fuel purge system comprises a three-way valve comprising a first port interfacing with a first line from a steam supply, a second port interfacing with a second line from a compressor discharge port of the compressor, and a third port interfacing with the air purge circuit, the three-way valve is configured to open the second and third ports and to close the first port while purging the gas fuel circuit with the air, and the three-way valve is configured to open the first and second ports and to close the third port while purging the gas fuel circuit with the steam.

6. The system of claim 3, wherein the air purge circuit and the steam purge circuit are completely independent circuits.

7. The system of claim 2, wherein the steam purge circuit comprises an orifice configured to enable a first portion of the steam to flow towards a compressor discharge port of the compressor and a second portion of the steam to flow into the steam purge circuit to purge the gas fuel circuit of the gas fuel system.

8. The system of claim 1, wherein the gas fuel purge system comprises a drain line configured to drain a steam condensate from the gas circuit while purging the gas fuel circuit with the steam.

9. A system, comprising:
 a dual air and steam purge system configured to purge a gas fuel circuit coupled to a multi-fuel gas turbine during liquid fuel operation of the gas turbine, wherein the dual air and steam purge system comprises an air purge circuit configured to purge the gas fuel circuit with air and a steam purge circuit configured to purge the gas fuel circuit with steam, wherein a controller is configured to control the dual air and steam purge system to sequentially purge the gas fuel circuit initially with the air by flowing the air through a gas manifold of the gas fuel circuit into a combustor of the multi-fuel gas turbine prior to meeting a steam injection permissive threshold of temperature and subsequently, upon meeting the steam injection permissive threshold, purge the gas fuel circuit with the steam by flowing the steam through the gas manifold into the combustor.

10. The system of claim 9, comprising the multi-fuel gas turbine having the dual air and steam purge system.

11. The system of claim 9, wherein the air purge circuit and the steam purge circuit are at least partially independent circuits.

12. The system of claim 11, wherein the air purge circuit and the steam purge circuit converge into a common purge circuit upstream of the gas fuel circuit.

13. The system of claim 9, wherein the air purge circuit and the steam purge circuit are completely independent circuits.

14. The system of claim 9, wherein the dual air and steam purge system comprises a three-way valve comprising a first port interfacing with a first line from a steam supply, a second port interfacing with a second line from a compressor discharge port of a compressor of the multi-fuel gas turbine, and a third port interfacing with the air purge circuit, the three-way valve is configured to open the second and third ports and to close the first port while purging the gas fuel circuit with the air, and the three-way valve is configured to open the first and second ports and to close the third port while purging the gas fuel circuit with the steam.

15. A method for purging a gas fuel circuit of a multi-fuel gas turbine, comprising:
 beginning operation of the multi-fuel gas turbine on a liquid fuel;
 initially purging the gas fuel circuit with air by flowing the air through a gas manifold of the gas fuel circuit into a combustor of the multi-fuel gas turbine;
 monitoring steam parameters of a steam supply to determine if the steam parameters meet a steam injection permissive threshold of temperature; and
 subsequently purging the gas fuel circuit with steam upon the steam parameters meeting the steam injection permissive threshold by flowing the steam through the gas manifold into the combustor.

16. The method of claim 15, comprising:
 closing a first port of a three-way valve interfacing with a first line from the steam supply and opening both a second port of the three-way valve interfacing with a second line from a compressor discharge port of a compressor of the multi-fuel gas turbine and a third port of the three-way valve interfacing with an air purge circuit when initially purging the gas fuel circuit with the air; and
 opening both the first and second ports of the three-way valve and closing the third port of the three-way valve while purging the gas fuel circuit with the steam.

* * * * *